United States Patent [19]

Narang et al.

[11] 3,865,807

[45] Feb. 11, 1975

[54] AROMATIC DEXTRAN DERIVATIVES

[75] Inventors: Saran A. Narang; Joseph J. Michniewicz, both of Ottawa, Ontario, Canada

[73] Assignee: Canadian Patents and Development Limited, Ottawa, Ontario, Canada

[22] Filed: Dec. 3, 1971

[21] Appl. No.: 204,764

[52] U.S. Cl.... 260/209 D, 260/211.5 R, 260/234 D
[51] Int. Cl............................................. C08b 19/08
[58] Field of Search......... 260/209 D, 209 R, 234 R

[56] References Cited
UNITED STATES PATENTS

| | | | |
|---|---|---|---|
| 2,203,703 | 6/1940 | Stahly et al. | 260/209 D |
| 2,203,704 | 6/1940 | Stahly et al. | 260/209 D |
| 2,853,414 | 9/1958 | Wimmer | 260/209 D |
| 2,989,409 | 6/1961 | Hiler | 260/209 D |
| 3,042,667 | 7/1962 | Flodin et al. | 260/209 D |
| 3,198,784 | 8/1965 | Griscomb et al. | 260/234 R |
| 3,629,230 | 12/1971 | Soderqvist | 260/209 D |

*Primary Examiner*—Johnnie R. Brown

[57] ABSTRACT

There is described an exchange resin comprising cross-linked dextran molecules having attached (a) groups containing aromatic rings and (b) cationic groups. A method of preparing the resins is also described.

11 Claims, 1 Drawing Figure

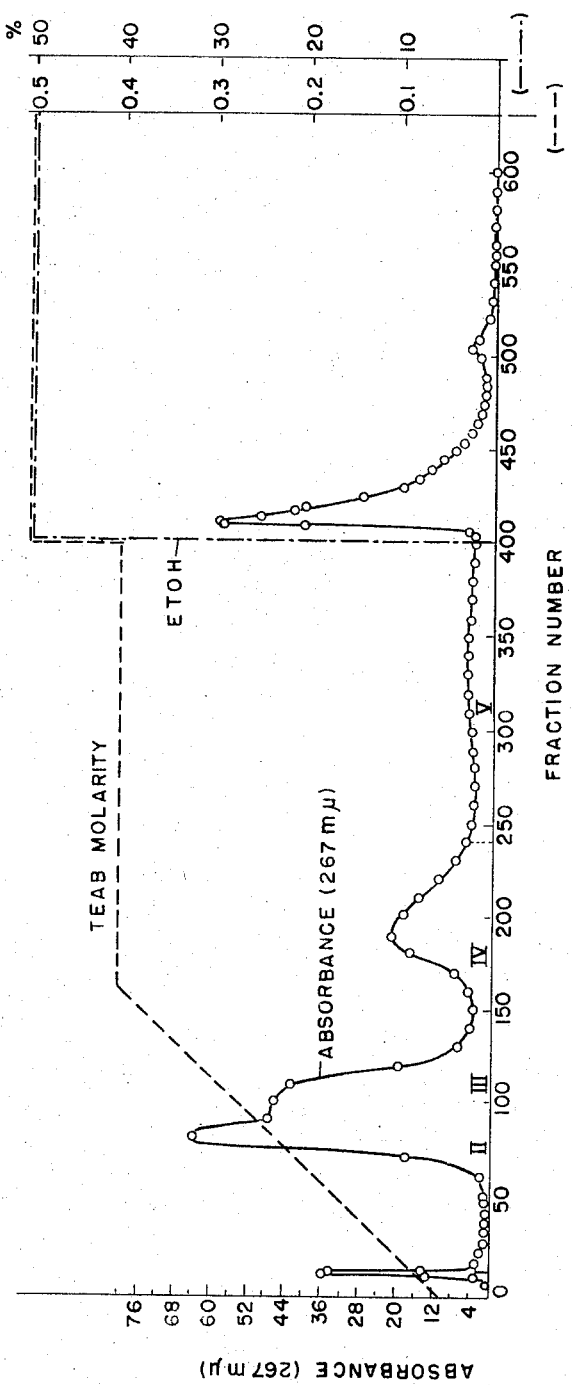

AROMATIC DEXTRAN DERIVATIVES

BACKGROUND OF THE INVENTION

1. Field of the Invention

This invention relates to ion exchange resins and, in particular, to ion exchange resins that are derivatives of dextran.

2. Description of the Prior Art

Organic compounds derived from the polysaccharide dextran and composed of microscopic beads are well known as molecular sieves. The derivatives are available in various forms for use in many different phases of chromatrography. They are prepared by reacting an alkaline dextran solution and epichlorohydrin. The reaction mixture solidifies exothermally to yield soluble polymer chains cross-linked by glycerol-1,3-ether bonds. This is a simplified scheme and a number of side reactions can occur. However it is believed that the cross-linked dextran ion exchange resins have the structure:

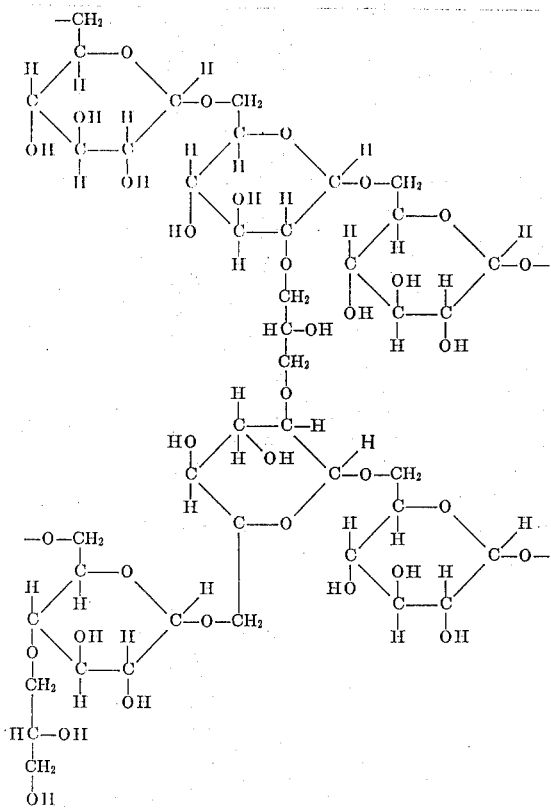

The above cross-linked dextran compounds have proved to be useful molecule seives. However it has also been found that the introduction of ionic groups into the cross-linked molecule produces valuable ion exchange resins. The ionic groups are attached to the glucose units of the polysaccharide chains by ether linkages. The ionic groups comprise charged, fixed groups and mobile counter ions. The latter can be exchanged reversibly with other ions of the same charge. If the fixed group is positive the resin has an affinity for negative ions and is described as an anion exchanger. If the fixed group is negative the affinity is for positive ions and the resin is described as a cation exchanger. For example, anion exchangers are available in which the fixed group is (I) diethylaminoethyl (in which the counter ion is e.g. chloride or sulfate) and (II) diethyl-2-hydroxypropyl ammonium (in which the counter ion is e.g. chloride). The first is a weakly basic anion exchanger, the second strongly basic. Similarly cationic exchangers are avaiable in which the fixed group is (i) carboxymethyl or (ii) sulfoethyl. Both are available with sodium as the counter ion. Carboxymethyl is weakly acidic; sulfoethyl is strongly acidic.

In recent years the use of chemically synthesized polynucleotides has played a major role in solving the genetic code. The availability of short DNA fragments, and therefore the necessity of finding better methods of obtaining these fragments, represents a crucial problem in molecular biology. DNA fragments of moderate length, if readily available, would have numerous important practical applications. For example they would be useful in (1) determining the sequence of DNA; (2) the synthesis of genes; (3) the study of protein-synthesizing systems; (4) examining the recognition mechanism of nucleic acid and proteins; (5) the elucidation of DNA and RNA replication; (6) miscellaneous biopolymer studies and (7) chemotherapy.

Synthesis of polynucleotides are known and Gillam et al. in Biochemistry, Vol. 6, Number 10, October 1967, page 3043 describe the separation of soluble ribonucleic acids on benzoylated diethylaminoethyl cellulose. They indicate that the substitution of the hydroxy groups of the DEAE-cellulose by the benzoyl groups increase the non-ionic attraction between it and the polynucleotides. Nevertheless the present methods remain laborious and time-consuming. A new and easier approach for the synthesis of polynucleotides has recently been developed by the inventors. Basically the technique is based on the following two principles. First the attachment of a substituted aromatic ring at the 5'-phosphomonoester end of the nucleotide leads to a great increase in its binding to benzoylated diethylaminoethyl-cellulose (DEAE-Cellulose), used to separate the produced nucleotides. Hence after each condensation between suitably protected nucleotides, the reaction mixture is passed through a benzoylated DEAE-Cellulose column. This column chromatography step effects the removal of any compound lacking the aromatic residue, for example the incoming protected nucleotides (lacking aromatic residues), cyclic phosphate, pyrophosphate and other side products. The removal of these impurities, especially pyrophosphate, is difficult by any of the earlier procedures. Secondly, the aromatic ring also acts as a 5'-phosphate protecting group due to its great stability towards alkali. Thus a more alkali-labile group, such as acetyl, on the 3'-hydroxyl end of the growing chain can be selectively removed in order to elongate the chain.

SUMMARY OF THE INVENTION

In the synthesis of polynucleotide chains, large amounts of intermediate protected di- and trinucleotides are generally required. During their preparation it has been essential to use a large size column of benzoylated DEAE-Cellulose. This is an expensive and time-consuming procedure. The present invention overcomes the above disadvantages by providing, according to its broadest aspect, an ion exchange resin made up of cross-linked dextran molecules having attached (i) ionic groups and (ii) aromatic groups.

DESCRIPTION OF THE PREFERRED EMBODIMENTS

Examples of ionic groups that may be used on the dextran include diethylaminoethyl, triethylaminoethyl (TEAE) and diethyl-2-hydroxypropylammonium all cationic groups. The counter-ions in these embodiments may be chloride or sulfate or other anions.

Examples of aromatic groups that have proved useful are benzoyl, 1-naphthoyl and anisoyl. These acyl groups are especially suitable because they provide good results and are very easy to introduce into the dextrans. For example benzoylation of a DEAE-cross-linked dextran sold under the trademark DEAE-Sephadex can be carried out by contacting benzoyl chloride with DEAE-Sephadex in an inert non-aqueous solvent, preferably pyridine. The product has a capacity at least about seven times that of benzoylated DEAE-cellulose and a significantly increased flow rate. These results are obtained from the use of the exchange resin in the preparation and purification of deoxyolignonucleotides.

Any aromatic group will prove useful as the function of the aromatic groups is to to increase the binding attraction of the dextran derivative. It is only necessary to have the aromatic group available in a compound that can react with the hydroxyl groups of the cross-linked dextran to introduce the aromatic group into the dextran molecule. Clearly the aromatic carboxylic acids and their derivatives, particularly the acid chloride and anhydrides, are useful since the hydroxyl groups of the cross-linked dextran resins can be esterified easily with such compounds. However aromatic substituted alkyl halides for example, benzyl chloride, diphenylmethyl chloride and triphenylmethyl chloride can be used to react with the cross-linked dextran to produce compounds in which the aromatic groups are joined to the dextran derivatives by ether linkages. In this procedure the reaction can be illustrated as

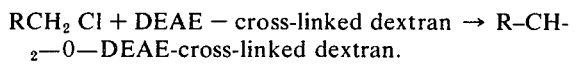

$RCH_2 Cl + DEAE - $ cross-linked dextran $\rightarrow R-CH_2-O-DEAE$-cross-linked dextran.

The invention also provides a method of preparing the aromatic dextran derivatives. In the method an aromatic compound containing a group able to react with a hydroxyl group in a cross-linked dextran compound, is reacted or condensed with the dextran compound. The reaction is preferably carried out in an inert solvent, preferably in pyridine.

In a particularly preferred embodiment of the method, benzoyl chloride, naphthoyl chloride or anisoyl chloride is reacted with DEAE-cross-linked dextran in an inert anhydrous solvent, preferably pyridine.

The invention is illustrated in the following example:

EXAMPLE

Preparation of Benzoylated DEAE-Cross-Linked Dextran

DEAE-Sephadex (A-25) (50 g) was dried overnight at 80° C in a vacuum oven (15 mm). To the dried DEAE-Sephadex suspended in pyridine (1 litre), benzoyl chloride (160 ml) was added during a period of 15 minutes. The mixture was refluxed for 3 hrs. The solid material was removed by filtration and re-suspended overnight in distilled water (12 litres). Again the solid was filtered off and then washed with the following solvents: twice with 95% ethyl alcohol (2 litres each), twice with 2M-NaCl-25% ethyl alcohol (2 litres each) and finally, extensively washed with 2 M NaCl until no pyridine or benzoic acid was present in the wash (examined by uv spectra). The final product, benzoylated DEAE-Sephadex (BD-Sephadex), was obtained in the form of light brown beads. It was stored at 4°C in 2M NaCl. An average saponification equivalent of 235 was found for BD-Sephadex as compared to DEAE-Sephadex (A-25) blank, 375.

Capacity of BD-Sephadex

BD-Sephadex (1 ml bed volume) was found to absorb 854 $O.D._{267}$ (optical density at 267 mu) of benzylhydracrylamide derivate of pT (thymidine-5'-phosphate), as compared to 129 $O.D._{267}$ (1 ml bed volume) for BD-Cellulose.

Using analogous methods, anisoyl and 1-naphthoyl DEAE-Sephadex can be prepared.

Use of BD-Sephadex in the Isolation of Aromatic Protected Deoxyolignonucleotides A typical condensation mixture from the chemical synthesis of prepared polynucleotides outlined above, free from pyridine was dissolved in 0.05M triethylammonium bicarbonate pH 7.5 and applied to a BD-Sephadex column (25 × 2.5 cm) at 4 C. The column was eluted with 0.25 M triethylammonium bicarbonate pH 7.5 to remove the unreacted component lacking the aromatic ring and also the pyrophosphate and other side products. The washing was continued till the optical density reading comes quite low. Next the more tightly bound components were eluted from the column by two different methods.

1. The column was subsequently washed with a stronger buffer 0.5M triethylammonium bicarbonate pH 7.5 containing 50% ethyl alcohol. The eluent is generally deep yellow in color. An example of a profile of an elution pattern is given in FIG. 1 which is the chromatography of the reaction product formed in the preparation of Ph. $CH_2NHCO.CH_2OpTpT$, on a benzoylated DEAE-Sephadex column (25 × 3.5 cm) by using a linear gradient of triethylammonium bicarbonate 0.05 - 0.4 M. 1 litre each, followed by 0.4 M triethylammonium bicarbonate 2.5 litres. Fractions containing 10 ml were collected every 6 min. The column was finally eluted with 0.5 M triethylammonium bicarbonate in 50% ethyl alcohol. Fractions of 24 ml were collected every 20 min. Fraction 410-550 contained the aromatic protected nucleotides.

2. The absorbent from the column was transferred to a beaker and stirred for 2 hr. with 0.5 M triethylammonium bicarbonate containing 50% ethyl alcohol. The supernatant was removed after centrifugation. Five washings are sufficient to elute 90% of the aromatic protected components.

The benzoylated DEAE-Sephadex can again be used after equilibrating each time with 0.05 M triethylammonium bicarbonate (teab) for 4-6 months. It was also found that a minor amount of benzoic acid (benzoyl groups) was liberated on storage. It has been found safer to store the product in IN NaCl at 4°C.

Some aromatic protected nucleotides are bound strongly in which case they can be eluted by using stronger salt solutions e.g. In NaCl-50% ethyl alcohol.

In addition to the above, the aromatic cross-linked dextran derivatives can be used (a) in the selected isolated of an aromatic protected terminated fragment of a partially degraded DNA molecule, (b) in the purification of transfer RNA, and (c) in the isolation of selected phosphorylated polynucleotides chains.

What I claim as my invention is:

1. Dextran molecules which are cross-linked through glyceryl diether groups, and have attached (a) groups containing hydrocarbon aromatic rings selected from the class consisting of benzyl, diphenylmethyl, triphenylmethyl, benzoyl, naphthoyl and anisoyl and (b) cationic groups selected from the class consisting of triethylaminoethyl, diethylaminoethyl and diethyl-2-hydroxypropyl-ammonium cationic groups, groups (a) and cationic groups (b) being attached to the dextran molecules by ether linkages.

2. Dextran molecules which are cross-linked through glyceryl diether groups of claim 1 wherein the cationic groups (b) are diethylaminoethyl.

3. Dextran molecules which are cross-linked through glyceryl diether groups of claim 1 wherein the groups (a) are benzoyl.

4. Dextran molecules which are cross-linked through glyceryl diether groups wherein the groups (a) are anisoyl.

5. Dextran molecules which are cross-linked through glyceryl diether groups of claim 1 wherein said naphthoyl of groups (a) are 1-naphthoyl.

6. Dextran molecules which are cross-linked through glyceryl diether groups of claim 1 wherein the groups (a) are benzoyl and the cationic groups (b) are diethylaminoethyl.

7. A method of preparing hydrocarbon aromatic derivatives of dextrans which are cross-linked through glyceryl diether groups comprising condensing the dextrans which are cross-linked through glyceryl diether groups, have free hydroxyl groups and have substituted amine or ammonium cathionic groups selected from the class consisting of triethylamino ethyl, diethylaminoethyl and diethyl-2-hydroxy-propyl-ammonium cationic groups, the cationic groups being attached to the dextrans by ether linkages, with an aromatic acyl chloride, which is selected from the group consisting of benzoyl chloride, naphthoyl chloride and anisoyl chloride, in an inert non-aqueous solvent to form ester-linked aromatic groups, heat being applied during the reaction.

8. A method as claimed in claim 7 wherein the halide is benzoyl chloride and the solvent is pyridine, and the condensation is carried out at reflux.

9. A method as claimed in claim 8 wherein the halide is benzoyl chloride, naphthoyl chloride or anisoyl chloride.

10. A method of preparing hydrocarbon aromatic derivatives of dextrans which are cross-linked through glyceryl diether groups consisting of condensing the dextrans, which are cross-linked through glyceryl diether groups, have free hydroxyl groups and have substituted amine or ammonium cationic groups selected from the class consisting of triethylaminoethyl, diethylaminoethyl and diethyl-2-hydroxypropyl-ammonium cationic groups, the cationic groups being attached to the dextrans by ether linkages, with an aromatic chloride, which is selected from the group consisting of benzoyl chloride, naphthoyl chloride and anisoyl chloride, in an inert non-aqueous solvent to form ester-linked aromatic groups, heat being applied during the reaction.

11. A method as claimed in claim 10 wherein the halide is benzoyl chloride and the solvent is pyridine, and the condensation is carried out at reflux.

* * * * *

UNITED STATES PATENT OFFICE
CERTIFICATE OF CORRECTION

PATENT NO. : 3,865,807
DATED : February 11, 1975
INVENTOR(S) : Saran A. Narang et al.

It is certified that error appears in the above-identified patent and that said Letters Patent are hereby corrected as shown below:

In column 4, next to the last line, cancel "lated" and insert therefor --lation--.

In Claim 4, line 2, between "groups" and "wherein", insert --of claim 1--.

Signed and Sealed this

Twenty-second Day of March 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,865,807
DATED : February 11, 1975
INVENTOR(S) : Saran A. Narang et al.

It is certified that error appears in the above-identified patent and that said Letters Patent are hereby corrected as shown below:

In Claim 1, last line, between "ether" and "linkages", insert --or ester --.

Signed and Sealed this ninth Day of August 1977

[SEAL]

Attest:

RUTH C. MASON
Attesting Officer

C. MARSHALL DANN
Commissioner of Patents and Trademarks